(No Model.)
C. C. & S. H. DUDLEY.
DINNER PAIL.
No. 309,137. Patented Dec. 9, 1884.
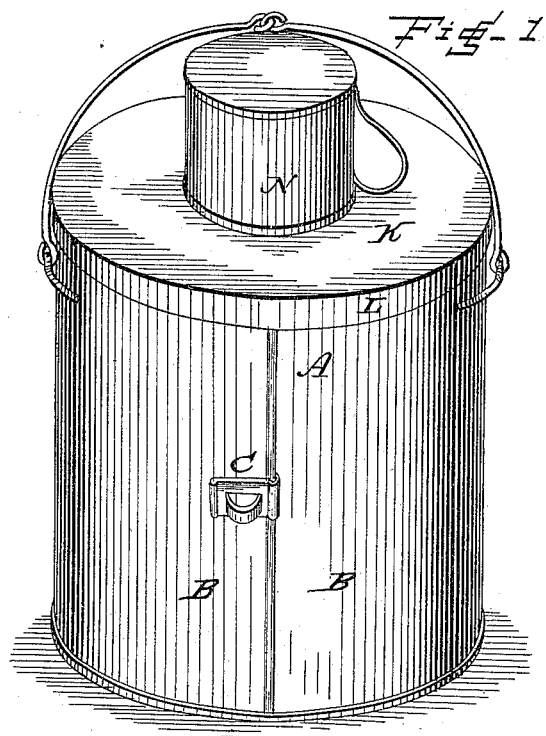
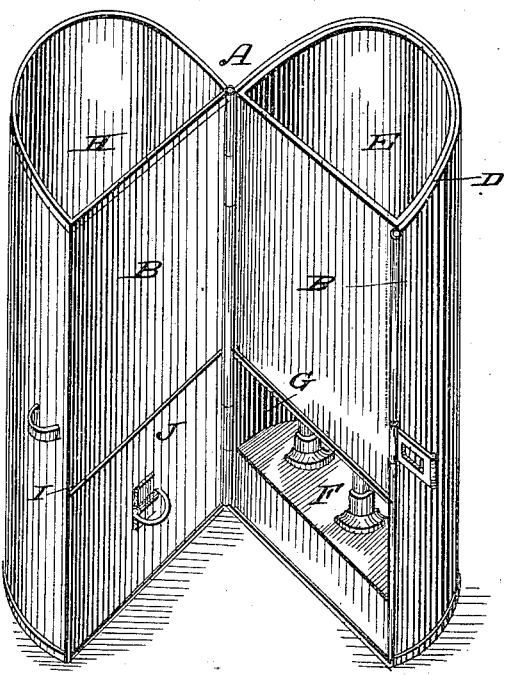
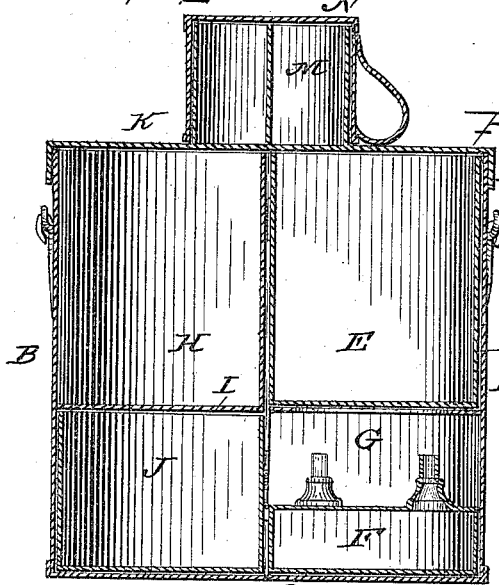
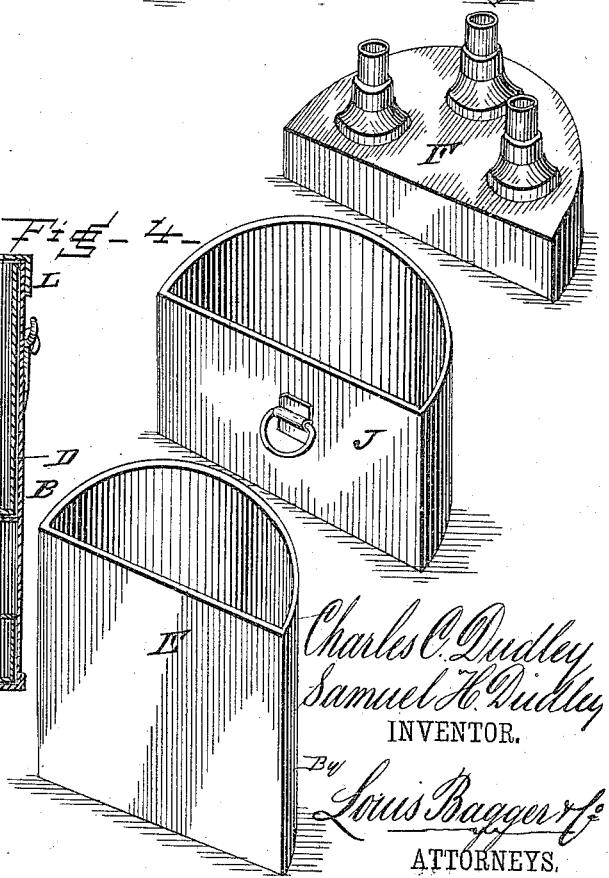
WITNESSES:
Charles C. Dudley
Samuel H. Dudley
INVENTOR.
By Louis Bagger & Co.
ATTORNEYS.

UNITED STATES PATENT OFFICE.

CHARLES C. DUDLEY AND SAMUEL H. DUDLEY, OF MAQUOKETA, IOWA.

DINNER-PAIL.

SPECIFICATION forming part of Letters Patent No. 309,137, dated December 9, 1884.

Application filed April 12, 1884. (No model.)

*To all whom it may concern:*

Be it known that we, CHARLES C. DUDLEY and SAMUEL H. DUDLEY, citizens of the United States, and residents of Maquoketa, in the county of Jackson and State of Iowa, have invented certain new and useful Improvements in Dinner-Pails; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved dinner-pail, showing it closed. Fig. 2 is a similar view showing it open. Fig. 3 is a vertical section of Fig. 1, and Fig. 4 is a perspective view of the removable vessels separate.

Similar letters of reference indicate corresponding parts in all the figures.

Our invention has relation to that class of dinner-pails in which the food may be heated by means of an inclosed lamp; and it consists in the improved construction and combination of parts of such a pail, which is composed of two hinged halves, the pail being divided vertically, as hereinafter more fully described and claimed.

In the accompanying drawings, the letter A indicates the pail, which is divided diametrically and vertically, forming two halves, B B, hinged together at their edges, and having hooks or catches C at their free edges, which will hold them together when closed. One half of the pail forms an upper larger compartment, D, which is open at the inner side of the hinged half, and a vessel, E, of a semi-cylindrical form, fits into this compartment, while a lamp, F, in which alcohol or similar fluid may be burned, fits in the lower compartment, G. The other hinged half of the pail has two compartments, H and I, the upper larger one, H, is closed upon its inner side and open at its top, while the lower compartment, I, is open at its inner side, and serves to receive a vessel, J, which fits into it.

It will be seen that the lamp will heat the contents of the larger or smaller vessel when they are placed above it, and that also the lamp, if desired, may be placed in the lower compartment under the closed compartment, heating its contents.

K is the cover, which has a downwardly-projecting flange, L, which will serve to hold the two hinged halves together, and at the middle of the cover is a receptacle, M, which may be divided into smaller compartments, over which receptacle the cup N will fit, covering it. In this manner it will be seen that the food may be carried in the vessels and compartments of the pail and be heated by the lamp, and by having the cylindrical pail divided into two hinged halves the most compact form, and at the same time most accessible construction, is obtained, and the several vessels being removable they will be easily cleaned.

Having thus described our invention, we claim and desire to secure by Letters Patent of the United States—

1. A dinner-pail consisting of two hinged halves swinging together, and provided with partitions to form a lower compartment for a lamp, and an upper compartment for the reception of the food to be heated, and having means for securing the halves together, the whole forming a pail of the usual external shape, as and for the purpose shown and set forth.

2. In a dinner-pail, the combination of the halves of the outer casing, hinged together at one edge, and provided with means for connecting their free edges, and provided with partitions to form in one half a small lower and a large upper compartment open at the inner side, and in the other half a small lower compartment open at the inner side, and a large upper compartment open only at the top, a semi-cylindrical vessel fitting in the upper inwardly-opening compartment, a semi-cylindrical vessel fitting in the lower compartment under the closed upper compartment, a lamp fitting in the lower compartment under the upper inwardly-opening compartment, a flanged cover having a receptacle at its top divided into compartments, and a cup fitting over the receptacle, as and for the purpose shown and set forth.

In testimony that we claim the foregoing as our own we have hereunto affixed our signatures in presence of two witnesses.

CHARLES C. DUDLEY.
SAMUEL H. DUDLEY.

Witnesses:
D. M. ALLISON,
MOTT WATSON.